United States Patent
Keller et al.

(10) Patent No.: US 10,350,811 B2
(45) Date of Patent: Jul. 16, 2019

(54) METHOD AND DEVICE FOR THE EXTRUSION AND LABELING OF A PACKAGING TUBE

(71) Applicant: Aisapack Holding S.A., Vouvry (CH)

(72) Inventors: Gerhard Keller, Vouvry (CH); Jacques Thomasset, Vouvry (CH)

(73) Assignee: Aisapack Holding S.A., Vouvry (CH)

(*) Notice: Subject to any disclaimer, the term of this patent is extended or adjusted under 35 U.S.C. 154(b) by 144 days.

(21) Appl. No.: 15/303,530

(22) PCT Filed: Apr. 15, 2015

(86) PCT No.: PCT/IB2015/052746
§ 371 (c)(1),
(2) Date: Oct. 12, 2016

(87) PCT Pub. No.: WO2015/159234
PCT Pub. Date: Oct. 22, 2015

(65) Prior Publication Data
US 2017/0028608 A1    Feb. 2, 2017

(30) Foreign Application Priority Data
Apr. 17, 2014    (EP) .................................. 14165267

(51) Int. Cl.
*B29C 49/04*    (2006.01)
*B29C 48/10*    (2019.01)
(Continued)

(52) U.S. Cl.
CPC .......... *B29C 49/04* (2013.01); *B29C 48/0021* (2019.02); *B29C 48/10* (2019.02);
(Continued)

(58) Field of Classification Search
None
See application file for complete search history.

(56) References Cited

U.S. PATENT DOCUMENTS

| 4,581,262 A | * | 4/1986 | Karabedian | B32B 27/08 |
| | | | | 428/34.7 |
| 4,883,697 A | * | 11/1989 | Dornbusch | B29C 49/24 |
| | | | | 428/35.7 |

(Continued)

FOREIGN PATENT DOCUMENTS

| DE | 1504918 A1 | 10/1969 |
| DE | 102006006993 A1 | 8/2007 |

(Continued)

OTHER PUBLICATIONS

International Search Report (ISR) of the parent application PCT/IB2015/052746 dated Aug. 21, 2015 including an English translation thereof.

(Continued)

*Primary Examiner* — Monica A Huson
(74) *Attorney, Agent, or Firm* — Andre Roland S.A.; Nikolaus Schibli

(57) ABSTRACT

The invention relates to a method for the extrusion and labelling of a packaging tube (14), comprising the following successive steps performed on an extrusion-labelling line, namely: a) forming a partially or fully tubular label (17) from a film (12); b) introducing the label (17) into a calibration element (22); c) extruding a tubular body (13) on the side of the concave surface of the label (17); d) bringing the external surface of the tubular body (13) into contact with the concave surface of the label (17), step (c) being performed in the calibration element (22). The invention also relates to an extrusion-labelling device and a packaging tube.

17 Claims, 4 Drawing Sheets

(51) Int. Cl.
  *B29C 48/00* (2019.01)
  *B29C 48/90* (2019.01)
  *B29C 69/00* (2006.01)
  *B29C 63/06* (2006.01)
  *B29C 49/24* (2006.01)
  *B29D 23/00* (2006.01)
  *B65C 3/02* (2006.01)
  *B65D 25/20* (2006.01)
  *B65D 59/04* (2006.01)
  *B29C 48/88* (2019.01)
  *B29L 31/00* (2006.01)
  *B29C 65/02* (2006.01)
  *B29C 65/78* (2006.01)
  *B29C 65/00* (2006.01)

(52) U.S. Cl.
  CPC ........ *B29C 48/903* (2019.02); *B29C 49/2408* (2013.01); *B29C 63/065* (2013.01); *B29C 69/008* (2013.01); *B29D 23/00* (2013.01); *B65C 3/02* (2013.01); *B65D 25/205* (2013.01); *B65D 59/04* (2013.01); *B29C 48/905* (2019.02); *B29C 48/908* (2019.02); *B29C 48/913* (2019.02); *B29C 48/916* (2019.02); *B29C 48/919* (2019.02); *B29C 65/028* (2013.01); *B29C 65/7894* (2013.01); *B29C 66/1122* (2013.01); *B29C 66/1142* (2013.01); *B29C 66/4322* (2013.01); *B29C 66/5326* (2013.01); *B29C 66/8266* (2013.01); *B29C 66/82661* (2013.01); *B29L 2031/744* (2013.01)

(56) References Cited

U.S. PATENT DOCUMENTS

2010/0272936 A1   10/2010  White et al.
2013/0206325 A1*   8/2013  Giuliani .................. B65C 3/00
                                                        156/184

FOREIGN PATENT DOCUMENTS

| EP | 0457561 A2 | 11/1991 |
| FR | 1311341 A | 12/1962 |
| JP | S57-103822 A | 12/1973 |
| JP | S57-109622 A | 12/1973 |
| SU | 1071215 | 6/1972 |
| WO | WO2007082652 A1 | 7/2007 |
| WO | WO2007092652 A2 | 8/2007 |

OTHER PUBLICATIONS

Written Opinion of the International Search Authority of the parent application PCT/IB2015/052746 dated Aug. 21, 2015.
European Search Report of EP 14165267 dated Jul. 1, 2014.
Chinese office action and translation dated May 8, 2018 for counterpart CN201580033091.1.
Office Action of Nov. 27, 2018 from the Japanese Patent Office in the counterpart application with the Serial No. 2016-562944 with English translation.
Office Action of Nov. 7, 2018 from the Russian Federal Institute of Industrial Property for the counterpart application with the Serial No. 2016144502/05(071378)with English translation.

* cited by examiner

Fig. 1 (Prior Art)
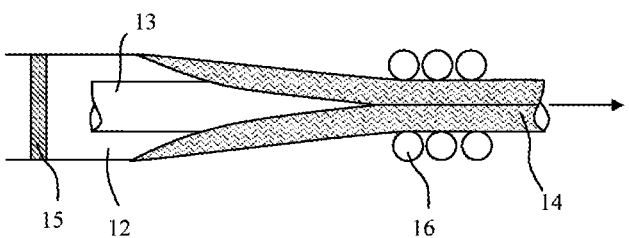
Fig. 2 (Prior Art)
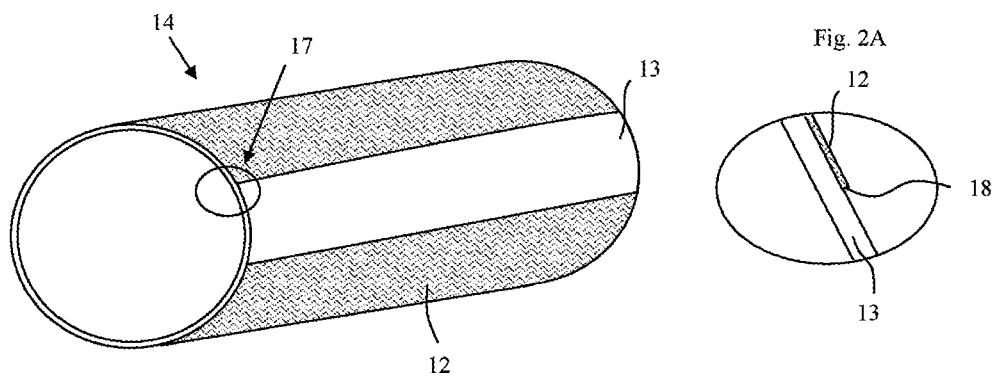
Fig. 2A

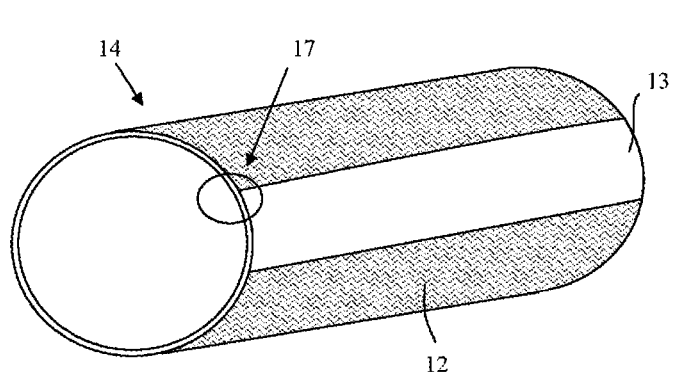
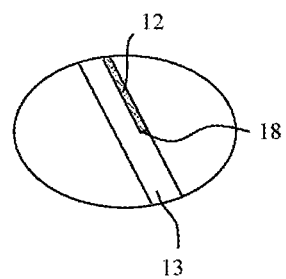
Figure 6
Fig. 6A
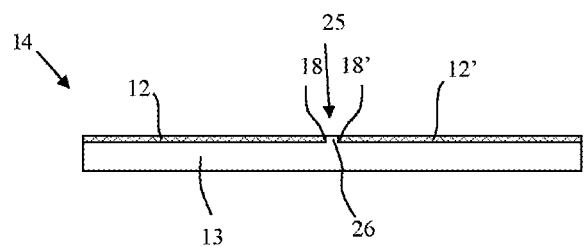
Figure 7
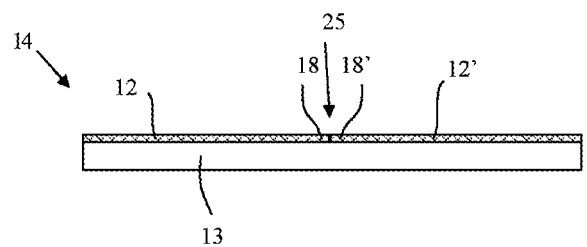
Figure 8

METHOD AND DEVICE FOR THE EXTRUSION AND LABELING OF A PACKAGING TUBE

CROSS REFERENCE TO RELATED APPLICATIONS

The present application is a U.S. national stage application of PCT/IB2015/052746 filed on Apr. 15, 2015 designating the United States, and claims foreign priority to International patent application PCT/IB2014/062119 filed on Jun. 11, 2014, and also claims foreign priority to European Patent Application EP 14165267.7 filed on Apr. 17, 2014, the contents of all three documents being herewith incorporated by reference in their entirety.

DOMAIN OF THE INVENTION

The invention relates to the field of tubes or cylinders, and more specifically to packaging tubes for viscous or liquid products in which the skirt is obtained by extrusion.

PRIOR ART

Flexible packaging tubes usually have two separate portions, specifically a skirt or flexible cylindrical body linked to a head comprising a neck and closed by a cap. The skirt of the tube is obtained by extrusion of a tubular body, or by welding a multilayer sheet.

There are numerous methods for adding the tube head to the end of a previously extruded skirt. The tube head may be molded by compression or injection and jointly welded to the skirt by overmoulding. Another method involves prefabricating the tube head by injection or compression molding, then assembling the tube head on the skirt by welding.

The tube thus formed is then decorated around the skirt. In some cases, the printing operation is carried out before assembly of the skirt and the tube head. This printing operation has several drawbacks related to the fact that the printing is not carried out flat but on the tubular shape of the skirt. This usually requires a more complex method and, consequently, costly equipment, slower production speeds and reduced flexibility. The limited flexibility of printing machines for example requires repeat operations for complex decorations such as screen printing or hot decoration.

In order to overcome decoration difficulties, a method involves applying a preprinted adhesive label. The label is related to a carrier film, usually made of PET, and is separated from the carrier during application to the outer surface of the tube. The label is pre-coated with a sticky adhesive that binds the label to the surface of the tube. The adhesive layer is protected by the carrier film before the label is applied to the tube.

The method disclosed in patent application WO 2007/092652 involves applying a thin label that is not stuck to a carrier film before use. According to this method, the spreading or activation of the adhesive layer takes place at the time the label is applied to the surface of the tube. A variant of this method involves applying the adhesive layer to the label at the time of application. Another variant involves applying the adhesive layer to the surface of the tube before application of the label. However, the method described in WO 2007/082652 has a number of drawbacks. The addition of an adhesive layer by spreading at the time of application of the label or the addition of an activation step makes the manufacturing process more complex, in particular when applied to a continuous tube extrusion line (FIG. 2 in WO 2007092652). Another drawback relates to the very short activation times of the adhesive layer required by this method, which may limit the choice of adhesives to costly adhesives. Another drawback relates to the packaging: a label added to the surface of the tube is not an integral part of the wall of the packaging. The edges of the label are sometimes visible or detectable to the touch and have an adverse effect on the decoration and aesthetic qualities of the packaging.

Patent application EP 0 457 561 A2 discloses a method and a device for producing extruded tubular bodies with a laminated film on the surface. This method involves forming a first tubular body from a film, extruding a lining member inside said tubular body, drawing the lining member radially and pressing the lining member against the tubular body. This method has several drawbacks. A first drawback is related to the fact that the lining member has to be extruded inside the tubular body formed by the film. This operation requires the tube diameter to be large enough to allow the tools required for extrusion and radial drawing of the extruded lining member to be inserted into the tube. The method proposed in this prior art document does not enable the manufacture of small-diameter tubes, in particular tubes with a diameter of less than 35 mm. EP 0 457 561 A2 also proposes the internal calibration of the diameter of the tube. In addition to the issues of size mentioned above, this method has the drawback of generating small variations in the external diameter of the tube. These variations, which depend on the regularity of the flow rate from the extruder, may result in decorating defects. Indeed, to obtain high-quality decoration, the ends of the decorative film on the outer surface of the tubular body must be fitted end to end. Variations in the extrusion rate mentioned above result in variations in the external diameter of the tubular body, thereby increasing or decreasing the distance between the ends of the decorative film. Such variations result in visual defects at the join between the ends of the decorative film.

Similar drawbacks are found in the methods and devices described in patent applications DE 1 504 918 and DE 10 2006 006 993.

There is therefore a need to overcome the aforementioned drawbacks.

DEFINITIONS

In the present text, the term "labeling" shall refer to the attachment of a film, also referred to as a "decorative film" or "label", to a tube.

The term "decoration" refers to a visual element used for information and/or aesthetic purposes.

GENERAL DESCRIPTION OF THE INVENTION

The invention relates to a method, a device and a tube, as defined in the claims.

The invention enables the decoration of extruded tube skirts using a cheap and flexible method. It involves combining extrusion operations with labeling operations to form a decorated tubular body. The label may be a single-layer or multilayer decorative film. The decorative film is incorporated into the packaging during extrusion when the tubular body is in the molten state, such that the outer surface of the decorated packaging forms a continuous surface with no roughness. In the method according to the invention, the decorative film is an integral part of the packaging, unlike a normal label which would be added to a previously formed package.

Preferably, the decorative film that forms all or part of the outer surface of the tubular body is welded to the tubular body by the heat of the extruded resin. According to one embodiment, the decorative film comes into contact with the molten extrudate before the cooling phase and before the calibration step.

The method according to the invention results from the combination of an extrusion method and a labeling method. The method involves bringing the label into contact about the tubular body in the molten state, preferably after the operation to form the tubular shape of the film. Advantageously, the resulting multilayered tubular structure is calibrated and cooled in order to obtain a decorated extruded tube.

According to a preferred embodiment of the invention, the method comprises a first step in which the film is formed into a partially or totally tubular shape, followed by a second step in which a tubular body in the molten state is extruded, followed by a third step in which the outer surface of the tubular body in the molten state is brought into contact with the (concave) inner surface of the label, and finally a fourth calibration step in which the outer surface of the label intended to form the outer surface of the tube is applied onto the internal surface of the gauge. The third step is performed using a pressure difference between the inner and outer surfaces of the tubular body. The fourth step is performed using a pressure difference between the inner surface and the outer surface of the tube.

The method according to the invention involves manufacturing an extruded tubular body having a decorative film label that, in a preferred embodiment, forms the entire outer surface thereof. In this preferred embodiment, the tubular body is entirely enveloped by the label when same passes through the gauge and the successive cooling tanks. The molten material does not rub against the cooled tools, which helps to improve the aesthetic appearance of the packaged products, and the resistance of same to impact and stress cracking.

According to a variant of the invention, a first pressure difference is used to bring the tubular body and the label into contact. This first pressure difference is exerted at least between the outlet of the extrudate from the nozzle of the tool and the contact zone between the inner surface of the film and the outer surface of the extrudate. This first pressure difference helps to prevent the formation of air bubbles between the label and the outer surface of the tubular body. According to one embodiment of the invention, the pressure difference is created by a positive air pressure inside the tube. An alternative embodiment for creating this pressure difference involves creating a negative-pressure chamber between the extruder and the calibration element. According to one embodiment, the tubular body and the label are brought into contact with one another immediately after formation of the film into a tubular shape.

According to a variant of the method, the film is formed into a tubular shape at the same time as the tubular body is inflated onto the inner surface of the film. According to this variant, the contact plane (the plane formed by the contact zone) between the film and the tubular body is inclined in relation to the axis of the tube, unlike in the prior art where the contact plane is always perpendicular to the axis of the tube.

Advantageously, a second pressure difference is exerted to press the outer surface of the tube against the inner surface of the calibration element, thereby preventing retraction of the tube during cooling. This calibration step helps to precisely adjust the external diameter of the tube. In the method according to the invention, the outer surface of the tube is formed by the label sliding onto the inner surface of the gauge. The tube is then cooled and cut using the conventional methods.

The label is preferably thin compared to the thickness of the extruded tubular body.

The label may be a multilayer film. When same is brought into contact with the extruded body in the molten state, the surface of the film forming the interface with the tubular body is heated to a temperature enabling said tubular body to be welded to the decorative film. According to the preferred embodiment, all of the heat required for welding is provided by the tubular body. On account of the thinness of same, the label is cooled on the (convex) outer surface of same at the same time as the welding operation. Cooling is effected by contact of the outer surface of the label with the inner surface of the gauge or by contact with water. Cooling the label at the same time as the welding operation helps to preserve the quality of the decoration as well as the surface properties of the label (gloss, matte effect, roughness, etc.).

Advantageously, the label is incorporated into the thickness of the packaging and covers the entire outer surface of the tubular body.

According to another embodiment of the invention, the label is only formed on a portion of the circumference of the tubular body, the edges of same being contained by the resin extruded such that the outer surface of the tubular body forms a continuous surface.

The label may provide the packaging with decoration. The label may also provide the packaging with surface properties modifying the "feel" of same. In this regard, the invention makes it possible to provide the surface of the packaging with other materials that are impossible or difficult to extrude, such as paper, textiles, soft-touch resins, etc.

The label is advantageously used for the barrier properties of same. This embodiment obviates the need to use a co-extrusion device for the tubular body.

Another advantage of the invention is to facilitate the extrusion of resin grades that are difficult to extrude as a result of being liable to stick-and-slip phenomena during calibration, or to surface defects, or to extrudate breakage.

More generally, the invention may be used to increase productivity since the molten material is no longer in direct contact with the surface of the gauge. The friction between the molten material and the calibration element found in a conventional extrusion method is eliminated, thereby enabling production speed to be increased.

The packaging resulting from this manufacturing method ensures very strong cohesion between the label and the tubular body. The risk of the label coming unstuck during use of the packaging is eliminated, unlike the packaging in the prior art that is produced using an adhesive label. Another advantage relates to the absence of any discontinuities on the surface of the tubular body, which helps to prevent problems related to labels, sections of which can accumulate dust, thereby adversely affecting the aesthetic properties.

The invention also makes it possible to produce decorated tubes of small or large diameter. The invention is very flexible and may be used in new facilities or to modify existing extrusion facilities.

The invention also comprises an extrusion/labeling device, as described in the claims. The device produced according to a preferred embodiment includes means for extruding a tubular body in the molten state, a vacuum cooling and calibration tank, means for conveying the cooled tube, cutting or rolling means and means for unrolling a film, a gooseneck shaper arranged between the extrusion head and the vacuum calibration tank, means for exerting a first pressure difference between the inside and the outside of the extruded tubular body, and means for exerting a second pressure difference between the inside and the outside of the tube when same passes through the vacuum calibration tank.

Preferably, the label passes through a gooseneck shaper arranged between the extrusion nozzle and the calibration element. The presence of the gooseneck shaper means that the label does not pass through the extrusion tools, which prevents damage being caused to the decorative film. In the present invention, the gooseneck shaper helps to extend the extrusion tools inside the tubular shape formed by the film. The use of a gooseneck shaper is advantageous for several reasons. It prevents contact between the film and the hot tools, and the compact size of same helps to reduce the length of the nozzle tool lying inside the gooseneck. The pressure drops, and consequently the pressure generated by the flow of molten material inside the tool, are greatly reduced.

According to a variant of the invention, the gooseneck shaper, combined with a pressure difference between the inside and the outside of the tubular body, helps to associate the tubular body and the decorative film inside the gooseneck. One advantage of this variant is the ability to position the gooseneck shaper close to the extrusion head in order to engage the tubular body as same exits the tool. The tubular body is placed on the film which slides on the gooseneck and simultaneously conveys the tubular body. The compact size of the gooseneck shaper is a major advantage. This shaper is easily inserted between the extrusion head and the calibration element.

Another variant of the invention involves extruding a tubular body with a resin comprising blowing agents. These blowing agents cause the inflation of the tubular body in the molten state, thereby bringing the external face of the tubular body in the molten state into contact with the internal face of the film. According to this variant, the contact between the outer layer of the tubular body and the inner layer of the film is preferably caused by the blowing agents contained in the resin, and not by a pressure difference. Furthermore, the external diameter is preferably calibrated by the action of the blowing agents, but may also be caused by a pressure difference between the inner surface of the tubular body and the outer surface of the film, or by the combination of the action of the blowing agents and a pressure difference. This variant of the invention is particularly advantageous for lightening the packaging without the drawback of the blowing agents adversely affecting the appearance of same. Indeed, the decorated film that forms the outer surface of the packaging provides the decoration and surface properties, and the use of blowing agents helps to reduce the quantity of resin used to form the extruded tubular body and to form the inner layer of the packaging.

The invention is not limited to the depositing of a film on the tubular body in the molten state. Another variant of the invention involves depositing the decorative film on the outer surface of a full extruded body including blowing agents. For example, the decorative film is deposited on the outer surface of an extruded cylindrical body including blowing agents. The expansion of the cylindrical body at the outlet of the extrusion tool causes the inner layer of the film to come into contact with the outer surface of the extruded body. Simultaneously or successively, the external diameter of the decorated cylindrical body is adjusted by passing the cylindrical body through a gauge and a cooling tank. This variant of the invention is particularly advantageous for making packaging parts such as the synthetic corks used in glass bottles. The wine market is an important market. The optimization of this type of cork may require differentiation of the surface properties (sliding, seal, decoration) and the core properties (contact with wine, elasticity, compression, resistance).

The decorative film may be deposited on extruded bodies with round, oval or square sections, or sections of a more complex shape.

SHORT DESCRIPTION OF THE FIGURES

FIG. 1 shows a prior art method described in patent application WO 2007092652, which involves applying a label 17 with no glue to the surface of the tubular body 13 in a step in which an adhesive layer 15 is applied just before assembly of the label 17 on the surface of the tube 13.

FIG. 2 shows a tube 14 from the prior art produced using the method described in application WO 2007092652. The label 17 is not embedded in the extruded tubular body 13. The edges 18 of the label 17 cause a discontinuity in the outer surface of the packaging which adversely affects the aesthetics of same.

Figure 5:
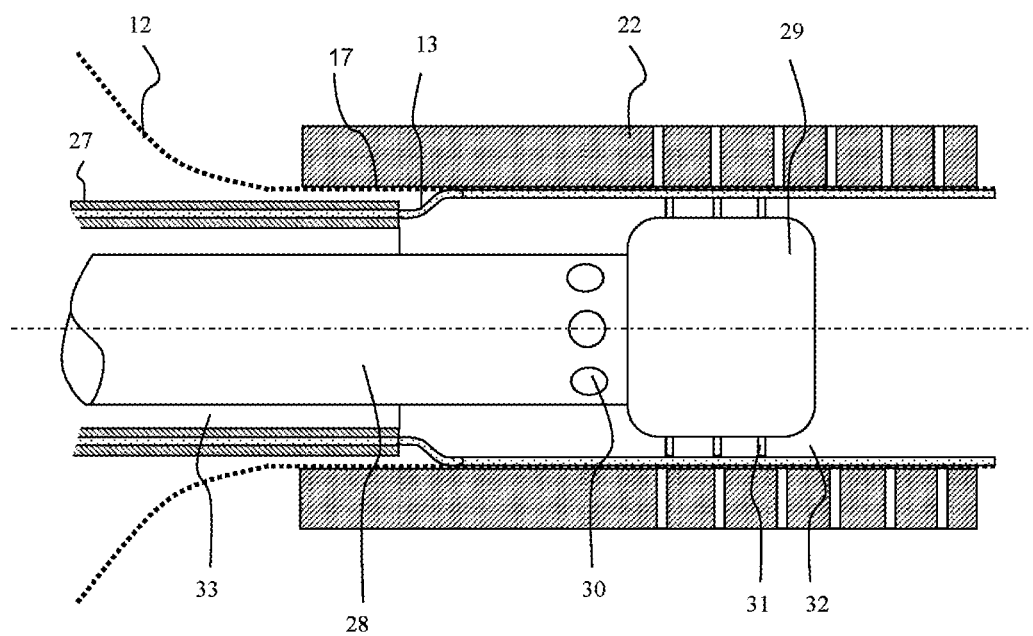

FIG. 5 shows an example device used to bring the decorative film 12 into contact with the tubular body 13, and to calibrate the external diameter of the tube 14.

FIG. 6 shows a tube 14 obtained using the method described in the invention. The ends 18 of the decorative film 12 are embedded in the tubular body 13.

FIG. 7 shows a partial cross section of a tube 14 including a decorative film 12 on the surface, the ends 18 and 18' of which are arranged end to end. The ends 18 and 18' are embedded in the tubular body 13.

FIG. 8 shows a variant of a tube 14 including a decorative film 12 in which the ends 18 and 18' are arranged end to end. According to this variant, the ends 18 and 18' are in contact and the outer surface of the tube 14 forms a continuous smooth surface.

DETAILED DESCRIPTION OF THE INVENTION

Figure 3:
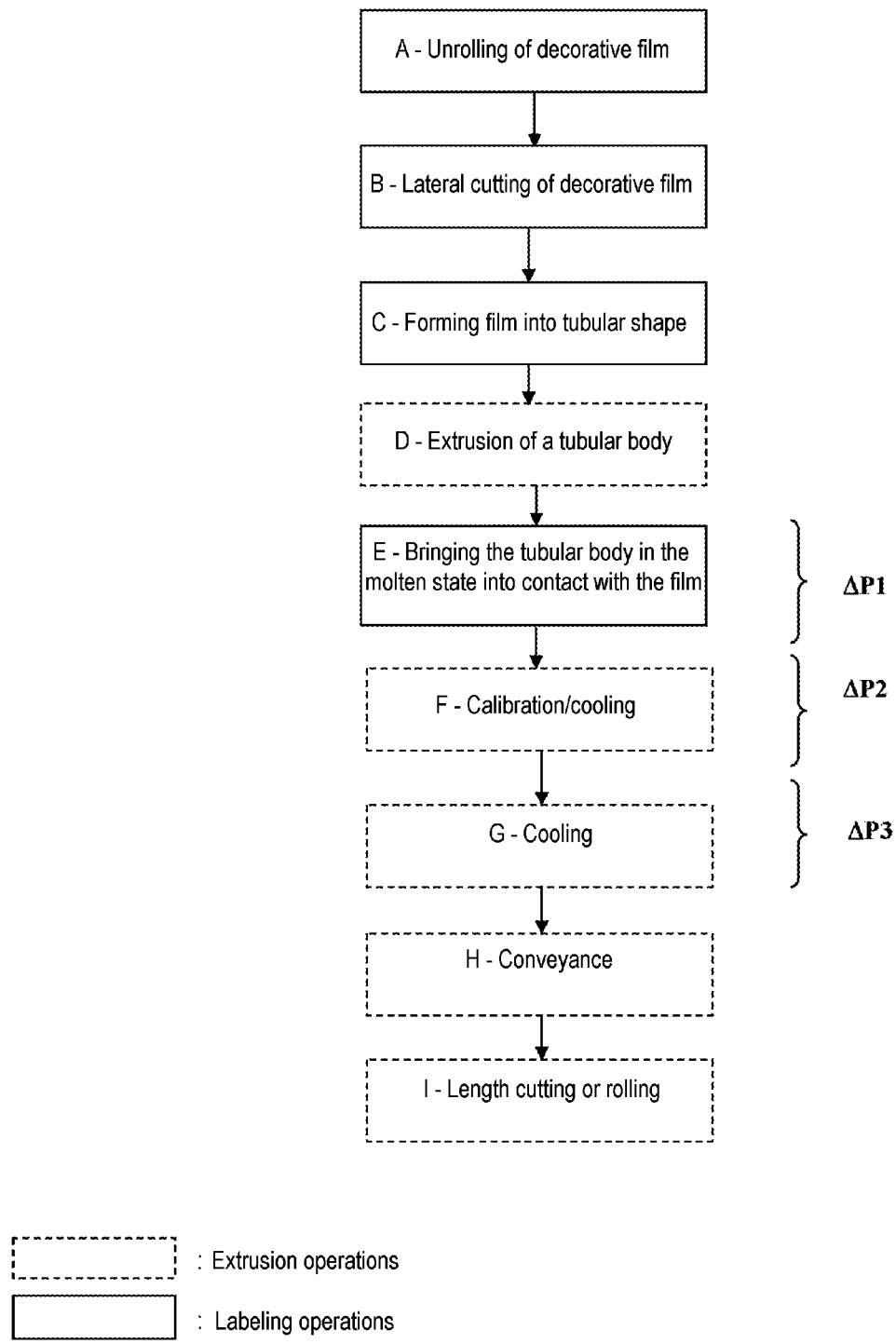
FIG. 3 shows the preferred embodiment of the method according to the invention. This method involves combining extrusion operations with labeling operations.

FIG. 3 shows the preferred embodiment of the invention, which involves forming a decorated tube by depositing a decorative film on the surface of an extruded tube while the extruded body is in the molten state. The method advantageously combines the extrusion operations D, F, G, H and I with the labeling operations A, B, C and E.

The extrusion operation D involves forming a tubular body in the molten state using known extrusion means.

According to the preferred embodiment, these means include an extruder and an extrusion head 24. According to an alternative embodiment, these means include several extruders and a co-extrusion head. According to the preferred embodiment, said extrusion head 24 is extended by a tubular portion referred to as the extrusion nozzle 27. The diameter of the nozzle 27 is less than the diameter of the tube to be formed such that the nozzle can be engaged inside the shaper 20. The extruded resin is outputted through the end of the nozzle 27 and forms a parison 13 located inside the tubular shape formed by the decorative film.

Upstream of the extrusion operation D, the labeling operations A, B and C involve respectively unrolling a decorative film placed on a reel (the label), then potentially cutting the lateral edges of the decorative film in order to fix the label to the diameter of the tube manufactured, and finally forming the film into a tubular shape. The formation of the tubular shape must be compact to enable the extrusion of the tubular body in the molten state inside the tubular shape formed by the decorative film.

The operation E involves bringing the outer surface of the tubular body in the molten state into contact with the inner surface of the decorative film. In the preferred embodiment shown in FIG. 3, the operations C and E are performed sequentially. The contact between the tubular body in the molten state and the decorative film is made after the decorative film has been wound around the tubular body. The means used for the operation C are preferably a gooseneck shaper, which enables the decorative film to be placed around the tubular body in the molten state while occupying a limited space. The means used for the operation E, which involves bringing the extruded tubular body into contact with the decorative film, are a pressure difference ΔP1 between the inside and the outside of the tubular body in the molten state. The preferred embodiment for application of this pressure difference is to at least partially plug the tubular body in the molten state and to generate an air pressure inside the tubular body in order to "inflate" the tubular body in the molten state against the decorative film. According to this embodiment, it may be advantageous to create a slight air leak around the plug in order to create an air cushion between the plug and the tubular body in the molten state. This air cushion prevents the inner surface of the tube from being marked and helps to prevent the plug from overheating. Another embodiment involves applying a negative pressure in a box arranged about the gooseneck. The diameter of the labeled tubular body at the output of the gooseneck is substantially equivalent to the diameter of the tube manufactured.

An alternative embodiment involves performing the film formation operation C and the contacting operation E simultaneously. In this case, the extrusion operation D May be performed before or simultaneously with the formation operation C.

The operation F, which comes after the operations D and E, enables the external diameter of the labeled tube to be calibrated. The operation F is performed by passing the extruded pipe through a calibration element including calibration and cooling means. A pressure difference ΔP2 between the inside and the outside of the tube is exerted during the operation F. This pressure difference presses the outer surface of the tube against the inner surface of the gauge at the time the tube is being cooled. According to the preferred embodiment, the pressure difference ΔP2 is created by a negative pressure in the calibration element. Water is usually used to cool the tube, either in the form of a bath or in the form of a shower. A major advantage of the method is related to the fact that the tribology during the calibration operation is substantially different to the conventional extrusion method. Indeed, in the method according to the invention, the plastic in the molten state is no longer in contact with the gauge since the label is positioned all the way around the tubular body in the molten state. This provides several advantages in addition to the advantages related to on-line decoration:

Option of increasing production speed without generating faults,

Broader range of resins that can be used to manufacture the tubes.

The operation G is optional. This operation enables the cooling of the tube to be perfected while ensuring a constant diameter. The operation G is in particular useful if the tube is particularly thick and if the tube has not been sufficiently cooled following the operation F. During the cooling operation G, a pressure difference ΔP3 between the inside and the outside of the tube may be used to keep the diameter of the tube constant during cooling. The operation G is commonly used for tube extrusion in the conventional methods.

The conveyance operation H is similar to the operation used for tube extrusion. This operation involves conveying the tube using profiled conveyor belts.

The length cutting operation I involves cutting the tube to the desired length. In the method according to the invention, the cutting operation must be synchronized with decoration of the tube.

Figure 4:
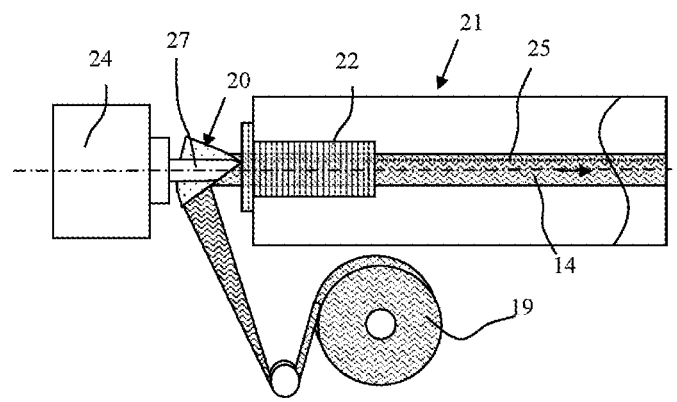
FIG. 4 shows a method according to the invention and an example device involving extruding a tubular body 13 and depositing a decorative film 12 onto the surface of said tubular body.

FIG. 4 shows an example of the method according to the invention and an example device. This method involves extruding a tubular body 13 and depositing a decorative film 12 onto the outer surface of said tubular body in the molten state.

The method includes the extrusion of the tubular body according to the methods known in the plastics industry. FIG. 3 shows the most common method, which involves using an extruder to melt the thermoplastic resin, before shaping same in a tool 24 including a nozzle 27. According to the preferred embodiment, the extruder is arranged perpendicular to the extrusion axis. The nozzle 27, the diameter of which is less than the diameter of the tube manufactured, is engaged inside a shaper referred to as a gooseneck 20. The operation to extrude the tubular body 13 from the end of the nozzle 27 is located close to the downstream portion of the gooseneck 20, i.e. close to the transition from which the decorative film 12 forms a cylinder.

The method includes the use of a decorative film 12 packed on rolls 19. The decorative film is unrolled in a continuous process at the linear manufacturing speed of the tube. The decorative film is then formed into a tubular shape about the extruded tubular body in the molten state 13 using a gooseneck shaper 20. One advantage of the preferred embodiment of the invention is related to the fact that the film 12 is completely separated from the extrusion and tooling unit 24, which helps to prevent the film 12 being subjected to high temperatures and to prevent the decoration from being damaged. The gooseneck 20 may be very small and is inserted between the extrusion device 24 and the calibration and cooling element 22, 21 of the tube 14. In a preferred embodiment, a gooseneck shaper is used.

When the decorative film 12 enters the gooseneck shaper 20, the inner surface of the decorative film may move close to the wall of the extrusion nozzle 27 and be heated by the radiation from the surface of the extrusion nozzle. Depending on the type of film used, it may be advantageous to use the radiation to preheat the inner surface of the film 12 before contact is made with the extruded material. Conversely, it may be necessary to protect the decorative film from the radiation from the extrusion nozzle to prevent the decoration from being damaged, for example. The radiation from the extrusion nozzle 27 may be limited by altering the radiating surface of said nozzle.

According to the preferred embodiment of the invention illustrated in FIG. 5, the tubular body in the molten state and the decorative film come into contact with one another at the outlet of the gooseneck when the decorative film forms a cylindrical shape. This contact is caused by a pressure difference $\Delta P1$ between the inside and the outside of the tubular body in the molten state. According to this preferred embodiment, a positive pressure is created inside the tubular body in the molten state 13 using a plug 29 that at least partially obstructs the internal section of said extruded tubular body. According to the preferred embodiment, the plug 29 includes flexible portions 31 that provide an at least partial seal with the wall of the tubular body in the molten state 13. According to the invention, said flexible portions yield slightly under the effect of the pressure, which results in the creation of an air cushion and a small downstream leak 32 between the plug 29 and the wall of the tubular body. Said plug is attached to the end of a blow pipe 28, which is preferably cooled and attached to the extrusion head 24. The downstream air leak 32 has a secondary effect of cooling the inner surface of the tubular body.

An alternative embodiment of the invention involves creating a second air leak through the extrusion head, referred to as the upstream leak 33. The flow rate of the upstream leak is precisely adjusted and enables the process to be stabilized, in particular the contact between the tubular body and the decorative film.

Another alternative embodiment of the invention involves using an expandable plug 29. An expandable plug facilitates start-up since the limited section of same facilitates passage of the tubular body. Expansion of the plug enables the downstream leak 32 to be reduced and controlled.

Another alternative embodiment of the invention involves using a retractable stowable blow pipe. According to this embodiment, the blow pipe 28 and the plug 29 are positioned inside the extrusion tool at the time of start-up, which facilitates extrusion of the tubular body. The blow pipe 28 and the plug 29 are then moved forward gradually into the working position.

According to the preferred embodiment of the invention, the tubular body 13 and the decorative film 12 are assembled when the tubular body 13 is in the molten state, such that the heat from the tubular body melts the inner surface of the decorative film 12. The contact time between the molten tubular body 13 and the decorative film 12 with no active cooling is adjusted to enable optimum welding without damaging the decoration. This time can be adjusted by adjusting the tools to delay passage of the tube through the actively cooled calibration zone. This time is optimized as a function of the film 12 used (thickness, number of layers, type of layers, position of decoration within thickness, type of ink, pigments, etc.) and of the tubular body 13 (thickness, number of layers, type of layers). In general, this time is very short and the active cooling by the outer surface of the tube 14 may be activated rapidly following assembly of the tubular body and the decorative film. According to the preferred embodiment, the cooling of the outer surface of the tube 14 begins from the time the tube 14 enters the gauge, which helps to safeguard the print quality of the decorative film. According to the preferred embodiment of the invention, the outer surface of the decorative film is not melted during manufacture of the tube 14. In particular, the decorated surface is kept at a temperature of at least less than the melting temperature of the supporting layer or less than the degradation temperature of the inks or pigments. Preferably, the gooseneck 20, which is upstream of the calibration and cooling element 22, 21, is also cooled or temperature-regulated using a water circuit.

During the operation to bring the tubular body in the molten state into contact with the decorative film, the tubular body in the melted state is "inflated" as a result of the pressure difference $\Delta P1$ between the inside and the outside of the tubular body in the molten state. After contact has been made, the tubular body is conveyed at the speed of movement of the decorative film. Generally, the tubular body undergoes radial and axial stretching between the outlet of the extrusion nozzle 27 and the time contact is made. This stretching effect may be used to adjust the thickness of the tubular body and to stabilize the process.

According to the preferred embodiment of the invention, the external diameter of the tube 14 formed by the tubular body in the molten state 13 and the decorative film 12 is calibrated by passing said tube 14 through the calibration element 22 and by the simultaneous action of a pressure difference exerted between the inner surface and the outer surface of the tube 14.

This pressure difference occurs when the tube 14 enters the calibration element 22 and causes the outer surface of the tube 14 to be pressed against the inner surface of the calibration element 22. The outer surface of the decorative film that has not been melted is then in contact with the surface of the gauge. In order to limit the friction between the outer surface of the film and the calibration tools, it may be advantageous to create a film of water between the calibration tools and the outer surface of the film.

The relative position of the plug 29 in relation to the calibration element 22 and to the cooling tank 21 makes it possible to determine the contact and calibration zones. If the plug 29 is located upstream of the calibration element 22, the pressure difference $\Delta P1$ created by the plug 29 creates a contact zone located upstream of the calibration tank. The pressure difference $\Delta P2$ in the calibration element 22 enables the external diameter of the tube 14 to be calibrated. If the plug is located inside the calibration element 22, there is a contact zone with a pressure difference $\Delta P1$, then a calibration zone for the external diameter with a pressure difference ($\Delta P1+\Delta P2$), and finally a calibration zone for the external diameter with a pressure difference $\Delta P2$. The relative position of the plug 29 in relation to the calibration element 22 is adjusted as a function of the decorative film and of the material extruded.

The preferred embodiment of the invention involves using at least one first pressure difference $\Delta P1$ to ensure contact between the decorative film 12 and the tubular body in the molten state 13 and a second pressure difference $\Delta P2$ to calibrate the external diameter of the tube 14. This arrangement is particularly advantageous for stopping and starting the line and for the precision of the calibration of the external diameter of the tube.

According to another embodiment of the invention, a single pressure difference $\Delta P1$ is used to perform the contact and calibration operations. In this variant, a blow pipe 28 that is long enough to maintain the diameter of the tube during hardening under the effect of cooling of the extruded material is used. This embodiment is advantageously combined with a retractable stowable blow pipe 28.

According to another embodiment of the invention, a single pressure difference $\Delta P2$ is used. This embodiment may advantageously be used if blowing agents are added to the extruded material. According to this embodiment, the addition of blowing agents to the extruded material causes contact to be made between the tubular body 13 and the label 17 while the pressure difference $\Delta P2$ enables the diameter of the tube to be calibrated.

A specific feature of the invention is that the friction surface of the tube 14 in the calibration tools is formed by the outer surface of the decorative film 12, which is not in the molten state. This helps to facilitate the calibration operation for the external diameter of the tube. The tribological properties between the inner surface of the gauge and the outer surface of the tube are changed radically in relation to a conventional extrusion operation. The method thereby enables the use of new extruded materials or increased extrusion speeds.

FIG. 6 shows the tubes 14 obtained using the method. The decorative film 12 forms all or part of the outer surface of the tube 14. The detail 6A shows the embedding of the end 18 of the decorative film in the wall of the tubular body 13. The outer surface of the tube 14 is continuous around the end of the decorative film 12. The label 17 is thin compared to the thickness of the tubular body 13.

FIGS. 7 and 8 show the embodiment of the invention with a label around the entire periphery of the tube.

FIG. 7 shows a first example embodiment of a 360° decoration of the tube where the ends 18 and 18' of the label 17 are arranged end-to-end and slightly spaced apart. The spacing of the ends of the label 17 may be related to the precision of the lateral cut of the label 17. Small spaces 25 between the ends 18 and 18' that are less than 100µ and invisible to the naked eye are sometimes obtained. The space 25 is filled by the resin forming the tubular body 13, thereby creating an outer surface of the tube 14 that is smooth and has no discontinuities around the ends 18 and 18'.

FIG. 8 shows a second embodiment in which the ends 18 and 18' of the label 17 are arranged end-to-end and in contact with one another. In this arrangement, there is continuity in the decorative film and the outer surface of the tube 14. Since the label 17 is thin compared to the thickness of the tubular body 13, the ends 18 and 18' are imperceptible. This embodiment is particularly advantageous with 360° decoration or to ensure continuity of the barrier properties if the barrier layer is carried by the label 17. This second embodiment may require lateral cutting means for the label 17 positioned upstream of the gooseneck 20. These cutting means ensure a precise adjustment of the width of the decorative film to achieve the end-to-end positioning shown in FIG. 8.

Another example embodiment of the invention involves forming an overlap between the ends 18 and 18' of the decorative film. This embodiment is particularly advantageous if the lower surface of the film 12 can be welded to the upper surface of same. Advantageously, the overlap is welded during the contact operation E and the calibration/cooling operation F. According to this preferred embodiment, the overlap is welded by the heat provided by the extruded tubular body in the molten state. An alternative embodiment involves adding a preheating operation before the operation E or an overlap-welding operation before, at the same time as or after the operation E.

In order to strengthen the tubular body about the ends 18 and 18' of the decorative film, another example embodiment of the invention involves increasing the thickness of the tubular body at the joining point of the ends of the film. This local thickness increase in the tube ensures that the tube is uniformly strong about the entire circumference of same.

Another example embodiment of the invention involves adding a reinforcing strip between the decorative film 12 and the tubular body 13 that joins the ends of the decorative film. Advantageously, the reinforcing strip is welded by the heat provided by the tubular body 13 in the molten state. If necessary, a preheating operation or a welding operation may be added to attach the reinforcing strip to the internal face of the film 12.

The extruded or co-extruded tubular body 13 is usually made of a thermoplastic resin from the polyolefin family (such as linear low-density polyethylene, low-density polyethylene, high-density polyethylene, polyethylene blends, polypropylene), but the invention is not limited to the use of the aforementioned resins. For example, the multilayer structure with an ethylene vinyl alcohol resin as an oxygen barrier and a polyolefin resin is commonly used to improve the barrier performance of the packaging. The tubular body 13 accounts for at least 70% of the thickness of the tube 14, and preferably at least 80% of the thickness of the tube 14.

The label 17 forms at least a portion of the outer surface of the tube 14. This decorative film for example enables the packaged product and the manufacturer to be identified and provides decoration, etc. According to the preferred embodiment, the decorative film is thin. The decorative film may be a single layer or multilayer and may be made of a wide variety of materials including paper, aluminum and plastic. The carrier film may also be made in part from a textile film to provide specific sensory properties. The decorative film 12 includes at least one layer that enables the decorative film to adhere to the tubular body 13 under the effect of the heat provided by said extruded body. The decorative film is preferably a single layer. The multilayer structure may comprise for example polyethylene, polypropylene, polyethylene terephthalate, polyamide, ethylene vinyl alcohol, paper, aluminum, metallization, silicon oxide or adhesive layers, inter alia. Preferably, the thickness of the decorative film is between 5 and 100µ, and advantageously between 10 and 50µ.

According to the preferred embodiment of the invention, the structure of the label 17 has at least one layer with a melting temperature exceeding 160° C. and at least one layer of the same type as the tubular body. The layer with good thermal stability may for example be made up of biaxially oriented polyethylene terephthalate (PET), polyamide (PA), aluminum (Alu) or paper. Example structures of the decorative film for a polyethylene tubular body include PET/PE, PE/PET/PE, PA/PE, Alu/PE, PE/Alu/PE and Paper/PET/PE.

The label 17 may be printed using any known flat printing method, such as flexography, screen printing, gravure printing, letterpress printing, offset printing, digital printing or a combination of these printing technologies. The invention is advantageously combined with digital printing for production that requires flexibility and rapid decoration changes. The print is usually covered by a protective varnish, which may also provide gloss or matte effects for example. The choice of varnish is important, in particular the coefficient of friction of same with the shaping and calibration tools.

The invention may advantageously be combined with on-line digital printing of the label 17. In this case, the role of decorative film 19 shown in FIG. 4 is replaced by a digital printing machine operating in synchrony with the labeling/extrusion line. According to a variant of this configuration, one or more lamination operations may also be performed on-line before the extrusion/decoration process. For example, a lamination operation is required if the print is to be contained within the thickness of the decorative film 12. A possible arrangement resulting in a contained printed layer can be achieved using the following steps:

Unrolling a first undecorated film,
Digital printing of the first film,
Lamination of a second film on the first film to contain the print—Decorative film obtained
Lateral cutting of the edges of the decorative film,
Extrusion/decoration process.

The decorative film 12 may be printed on the front or on the back such that the print is found on the surface of the tube 14 or contained within the thickness of the tube. The printing is advantageous for providing complex decorations at low cost since the decoration operation is performed flat on a thin film.

The invention is particularly advantageous for providing tubes with high-quality decoration at low cost.

The invention is particularly advantageous for improving the sensory properties of the tubes by providing a decorative film with a surface layer having a particular "feel". These properties are provided for example by a matte biaxially oriented polypropylene film or a textile film.

The invention is particularly advantageous since it enables the functionality of the packaging to be altered by changing the decorative film. These functions may be aesthetic (decoration), sensory (feel), technical (barrier properties) or informative (information on packaging).

The invention is particularly advantageous since the decorative film forms an integral part of the packaging. The decorative film is incorporated into the structure of same and contributes to the properties of same.

The invention is not limited to the example multilayer structures mentioned in the text. It is obvious to the person skilled in the art that the invention enables the number of possible structures to be increased and a range of different materials to be used (plastic, paper, aluminium, etc.).

By default, the invention enables the manufacture of undecorated tubular bodies incorporating a surface film. This variant may be used more specifically to improve the mechanical, barrier or sensory (feel) properties of the tubes.

The invention may be used in the field of packaging primarily to provide decoration but also in technical fields to improve mechanical or barrier properties. An advantageous embodiment of the invention involves providing the barrier and the decoration using the film. The multilayer film that provides the barrier and the decoration is associated with a multilayer extruded body, which helps to simplify the extrusion device.

When extruding a difficult product, the invention may be used to reduce production costs while increasing production speeds.

A first variant of the invention involves the following successive operations:
Welding of a first tubular body from a single-layer or multilayer film,
Extrusion of a second tubular body in the molten state on said first tubular body,
Simultaneous depositing of the label on the outer surface of the second tubular body using the method according to the invention.

A second variant of the invention involves containing the label within the wall of the tube. To do so, the following operations are carried out:
Extrusion of a first tubular body in the molten state,
Simultaneous depositing of the label on the outer face of the first tubular body using the method according to the invention,
Extrusion of a second tubular body and depositing of said second tubular body in the molten state on the outer face of the label.

The second tubular body in the molten state is deposited on the outer face of the label, preferably when the first tubular body has at least partially cooled.

A third variant of the invention involves attaching a film to the outer surface of and extruded tubular body incorporating blowing agents. The following method is used:

Extrusion of the tubular body in the molten state from a resin incorporating blowing agents,
Depositing of the film about the tubular body using a gooseneck shaper,
Bringing the outer surface of the tubular body into contact with the inner face of the film by inflating the tubular body using the blowing agents,
Calibration of the tubular body and cooling.

A fourth variant of the invention is used to manufacture cylindrical bodies incorporating blowing agents and a surface film. The following method is used:
Extrusion of a cylindrical body in the molten state from a resin incorporating blowing agents,
Depositing of the film about the cylindrical body using a gooseneck shaper,
Bringing the inner surface of the film into contact with the outer surface of the cylindrical body by inflating the cylindrical body using the blowing agents,
Calibration of the cylindrical body and cooling.

The blowing agents used may be physical or chemical blowing agents. The physical blowing agents mixed with the polymer are for example carbon dioxide gas or nitrogen gas in which the change of state (liquid to gas) expands the polymer in the molten state. The chemical blowing agents may be azodicarbonamide or azobisformamide. The advantage provided by the invention when making expanded cylindrical or tubular bodies is the combination of the surface properties and decoration provided by the film and the lightening properties provided to the core by the blowing agents.

The invention claimed is:

1. A method for extrusion and labelling a packaging tube, performed on an extrusion-labelling line, comprising the steps of:
    forming a partially or fully tubular label from a film;
    continuously feeding the film of the tubular label into a calibration device;
    continuously extruding a tubular body and feeding the tubular body to a side of a concave surface of the tubular label; and
    bringing an external surface of the tubular body into contact with the concave surface of the tubular label whilst passing the tubular body and the tubular label through the calibration device,
    wherein the step of extruding is performed inside the calibration device.

2. The method of claim 1, wherein the step of bringing the external surface includes a step of establishing a first pressure difference between an interior and the exterior surface of the tubular body.

3. The method of claim 2, wherein the step of bringing the external surface includes a step of establishing a second pressure difference between an interior and an exterior of the packaging tube.

4. The method of claim 3, wherein the second pressure difference is used exclusively to calibrate the packaging tube.

5. The method of claim 2, wherein the tubular body includes a resin having a blowing agent to cause the tubular body to inflate either in a molten state or after the step of extruding.

6. The method of claim 5, wherein the tubular label includes two ends which are arranged end to end or overlap or are spaced apart by a space, the space being filled with the resin that forms the tubular body.

7. The method of claim 2, further comprising a step of: creating an increase of thickness of the tubular body at a joining point of ends of the film.

8. The method of claim 2, further comprising the step of: adding a reinforcing strip that joins ends of the film.

9. The method of claim 2, further comprising the step of: enclosing the tubular label within a wall of the packaging tube by extruding a second tubular body and applying the second tubular body in a molten state to the external surface of the tubular label.

10. The method of claim 2, wherein the tubular label has a monolayer or multilayer structure.

11. The method of claim 10, wherein the multilayer structure includes at least one of polyethylene, polypropylene, polyethylene terephthalate, polyamide, ethylene vinyl alcohol, paper, aluminum, metallization or silicon oxide layers, and adhesive layers.

12. The method of claim 2, wherein the tubular label is printed.

13. The method of claim 1, wherein the step of continuously feeding the film and the step of continuously extruding the tubular body are performed simultaneously.

14. The method of claim 1, wherein the step of forming the partially or the fully tubular label from the film includes a step of continuously passing the film through a gooseneck shaper.

15. The method of claim 1, wherein the step of bringing the external surface includes a step of establishing a pressure difference between an interior and the exterior surface of the tubular body to expand the tubular body towards the tubular label.

16. The method of claim 15, wherein the pressure difference is established by using air provided by a plug arranged to at least partially obstruct an internal section of the tubular body.

17. The method of claim 1, further comprising the step of: sealing the tubular body in a molten state towards an inner wall of the calibration device.

* * * * *